United States Patent Office 3,161,596
Patented Dec. 15, 1964

---

3,161,596
LIQUID LUBRICANT COMPOSITION
George M. Calhoun, Berkeley, Calif., assignor to Shell Oil Company, a corporation of Delaware
No Drawing. Filed Dec. 14, 1959, Ser. No. 859,128
3 Claims. (Cl. 252—46.6)

This invention relates to improved functional organic compositions and additives therefor. More particularly, the invention relates to improved fuels and lubricants.

In general, hydrocarbon compositions are doped with various oil-soluble compounds, such as stabilizers and anti-oxidants, e.g., alkyl phenols and bisphenols; detergents and corrosion inhibitors such as organic salts, e.g., carboxylates, phenates, phosphates, sulfonates and thiocarbamates; anti-wear and extreme pressure agents such as esters of carboxylic acids or phosphorus acids, e.g., partial esters of fatty acids and polyhydric alcohols or alkyl phosphites or phosphates, or free fatty acids and sulfur derivatives thereof such as $C_{10-18}$ fatty acids (oleic or stearic acids) and sulfurized unsaturated fatty acids, e.g., sulfurized oleic acid. However, these compounds when used in liquid hydrocarbons, such as lubricating oil compositions which are subjected to high temperatures and pressures break down and fail to impart their expected desired properties under extreme conditions.

It has now been discovered that liquid hydrocarbon compositions are improved with respect to stability, wear inhibition and extreme pressure properties and contribute to minimizing octane requirement increases when used in an internal combustion engine, and the like by incorporating therein a minor amount of an oil-soluble omega-polar-substituted 2-thiaalkyl phosphono-containing compound having the general formula:

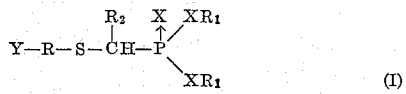

wherein R is an oil-soluble hydrocarbyl group, such as an alkyl, aryl, aralkyl, alkaryl or cycloalkyl radical having at least 2 and preferably being an alkyl radical having from 6 to 18 carbon atoms, $R_2$ is a $C_{1-4}$ alkyl radical or hydrogen, the $R_1$'s are the same or different groups selected from hydrogen, hydrocarbyl, or cationic groups, such as metallic or non-metallic cationic group, such as mono or polyvalent metal or amine, preferably an alkylamine, the X's are independently chalcogen atoms having an atomic number of from 8 to 16, i.e., oxygen or sulfur, and Y is a polar radical such as halogen, —$XR_1$, —$CXXR_1$, $N(R)_2$, where the X's and $R_1$'s are the same as defined above, with preferred polar group being —OH, —COOH and —Cl. Preferred compounds of the general Formula I have the following formula:

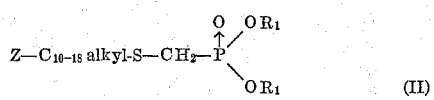

where Z is a hydroxyl, carboxyl or chloride group.

The omega-polar substituted 2-thiaalkyl phosphono compounds are prepared by reacting an omega-polar substituted mercaptan having at least 2 carbon atoms with a halomethylphosphono compound such as chloromethylphosphonic acid or its ester or salt derivative in a suitable solvent, such as an aqueous alcoholic solution, at reflux temperature and under inert conditions until the reaction is completed which normally may require up to about 5 days. The omega-substituted mercaptans include omega-substituted aliphatic mercaptans such as omega-hydroxy, omega-carboxy, omega-aminoethyl, butyl, hexyl, octyl, decyl, dodecyl, octadecyl, phenyldecyl, benzyl mercaptans and the like.

The following examples illustrate the preparation of the additives for use in accordance with the present invention.

EXAMPLE I

Stoichiometric amounts of dibutyl chloromethyl phosphonate and beta-carboxy ethyl mercaptan

were dispersed in an aqueous solution of ethyl alcohol and KOH and refluxed under a nitrogen atmosphere for about 24 hours. The final product was recovered by acidification and extraction with ether. It was dibutyl delta-carboxy-2-thiabutyl phosphonate

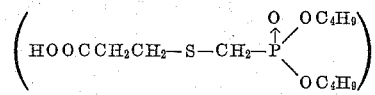

oil-soluble and possessed good extreme pressure and anti-oxidant properties.

EXAMPLE II

Stoichiometric amounts of dibutyl chloromethyl phosphonate and beta-omega-hydroxy-substituted mercaptan ($HSCH_2CH_2OH$) were reacted under the conditions of Example I to yield dibutyl omega-hydroxy-2-thiamethyl phosphonate

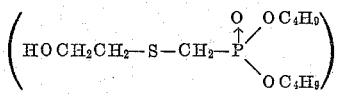

which possess good oil-solubility, extreme pressure and anti-oxidant properties.

EXAMPLE III

Dibutyl omega-chloro-2-thiabutyl phosphonate

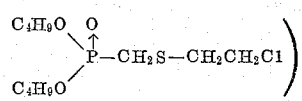

was prepared by reacting dibutyl omega-hydroxy-2-thiabutyl phosphonate with thionyl chloride in the presence of pyridine.

EXAMPLE IV

Di-2-ethylhexylamine salt of omega-hydroxy-2-thiabuty phosphonic acid

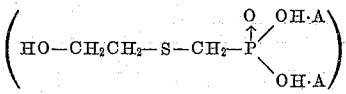

where A is the amine, was prepared by mixing stoichiometric amounts of di-2-ethylhexylamine with the acid at room temperature.

EXAMPLE V

Monobutyl omega-carboxy-decylmercaptomethylphosphonate was prepared according to the procedure of Example I by reacting stoichiometric amounts of monobutyl chloromethylphosphonate with potassium salt of omega-carboxydecyl mercaptan.

The following additional compounds were prepared: omega - hydroxyoctylmercaptomethylphosphonic acid, omega - hydroxydodecylmercaptomethylphosphonic acid, omega-aminohexylmercaptomethylphosphonic acid, omega-chlorohexylmercaptomethylphosphonic acid, omega-chlorobutylmercaptomethylphosphonic acid, dibutyl omega-carboxydecylmercaptomethylphosphonate, phenyl omega-carboxydecylmercaptomethyl acid phosphonate, dithiobutyl omega - carboxyhexylmercaptomethylphosphonate, tert-octadecylamine omega-hydroxydodecylmercaptomethylphosphonate and mixtures thereof.

The additives of this invention are novel compounds. They are oil-soluble and can be used in amounts of from about 0.1% to about 25%, preferably from about 0.5% to about 5.0% by weight.

Phosphono compounds of this invention are outstanding additives for various liquid hydrocarbon products, such as natural and synthetic hydrocarbon lubricating oils, greases, fuels (gasoline, kerosene, gas oil, burner fuel oil), asphalts, waxes, slushing oils, industrial oils, e.g., metal working and drawing oils, quenching oils, textile oils, hydraulic oils, dielectric compositions and other industrial oils. They are particularly outstanding when added in small amounts to lubricating oils and lubricating compositions to impart extreme pressure and anti-wear properties to such materials. Also, these additives are useful additives for gasoline, fuel oils, and other light oil products.

Lubricating oils useful for the preparation of compositions of this invention can be one or more of a variety of synthetic oils or natural hydrocarbon oils having a viscosity range of from 50 SUS at 100° F. to 250 SUS at 210° F. (SAE viscosity number ranging from SAE 10W to SAE 90). The natural hydrocarbon oils can be obtained from paraffinic naphthenic, asphaltic or mixed base crudes, and/or mixtures thereof. Synthetic oils include polymerized olefins, alkylated aromatics, isomerized waxes, copolymers of alkylene glycols and alkylene oxides (Ucon fluids) which are described in U.S. Patents 2,425,755, 2,425,845 and 2,774,733 such as Ucon 50HB170, Ucon 50HB660 or Ucon LB 550X and which are copolymers of ethylene and 1,2-propylene oxides, the mono and diols, as well as their ester derivatives; organic esters of aliphatic dibasic acids such as di-2-ethylhexyl sebacate or di-2-ethylhexyl adipate and the like. The hydrocarbon oils may be blended with fixed oils such as castor oil, lard oil and the like and/or snythetic oils as mentioned or silicone polymers and the like. Two typical oils A and B are paraffinic and naphthenic in character, respectively, having the following properties:

|  | (A) (SAE 10W) | (B) (SAE 30) |
| --- | --- | --- |
| Pour point, ° F | −10 | −5 |
| Flash, ° F | 390 | 415 |
| Viscosity, SUS at 210° F | 44 | 58 |
| Viscosity Index | 90 | 60 |

Other suitable oils are the 1010 and 1065 grade gas turbine lube oils represented by the following:

| Grade | 1010 | 1065 |
| --- | --- | --- |
| Flash, COC, ° F | 300 | 465 |
| Pour, ° F | −10 | 0 |
| Viscosity, SUS at 100 ° F | 59.4 | 530 |
| Neutral Number | 0.02 | 0.01 |
| Ash | None | None |

The following compositions are illustrative of the invention, the percentages being by weight, of the indicated additive or additives with the remainder being essentially the base.

Composition A:
    Example I additive _____ 2%.
    1010 Mineral oil _____ Essentially balance.
Composition B:
    Example II additive _____ 2%.
    1010 Mineral oil _____ Essentially balance.
Composition C:
    Example III additive _____ 2%.
    1010 Mineral oil _____ Essentially balance.
Composition D:
    Example IV additive _____ 2%.
    1010 Mineral oil _____ Essentially balance.
Composition E:
    Example II additive _____ 1%.
    SAE 30 Mineral oil _____ Essentially balance.
Composition F:
    Example I additive _____ 2%.
    SAE 90 Mineral oil _____ Essentially balance.
Composition G:
    Example I additive _____ 2%.
    Lauric acid _____ 2%.
    SAE 90 Mineral oil _____ Essentially balance.
Composition H:
    Example I additive _____ 5%.
    Ucon 50HB660 (polyethylene-propylene glycol having an SUS viscosity at 100° F. of 660) _____ Essentially balance.
Composition I:
    Example I additive _____ 2%.
    Di-2-ethylhexyl sebacate _____ Essentially balance.
Composition J:
    Example I additive _____ 1%.
    Leaded gasoline (3 cc. of TEL) _____ Essentially balance.
Composition K:
    Example I additive _____ 0.1%.
    Fuel Oil (No. 2) _____ Essentially balance.

Compositions of this invention were evaluated for their extreme pressure properties in the 4-Ball Wear Machine described in Engineering Vol. 136, July 13, 1933.

*Table I*

4-BALL WEAR TEST

[1800 r.p.m., 10 sec., steel on steel, ambient temp.]

Composition:                 Initial seizure load, kg.
    Mineral oil (1010) _____ 40–50
    Composition A _____ 158–178
    Composition B _____ 158–178
    Composition C _____ 158–178

The phosphono compounds of this invention are useful also for providing superior load-carrying properties for lubricating oils which contain minor amounts of other agents, such as silicone anti-foaming agents, alkylphenol anti-oxidants, polyacrylate ester viscosity-index improvers, long chain fatty acids such as lauric and oleic acids, oiliness agents and the like.

We claim as our invention:

1. A lubricating oil composition comprising a major amount of a lubricating oil and a minor amount, sufficient to impart extreme pressure properties to organic liquid of an oil-soluble alkylmercaptomethylphosphono compound having the general formula

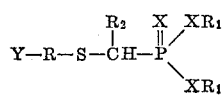

wherein R is an oil-soluble $C_{2-18}$ alkyl radical, the $R_1$'s are selected independently from the group consisting of hydrogen and $C_{1-4}$ alkyl radical, and mixtures thereof, $R_2$ is selected from the group consisting of hydrogen and a $C_{1-4}$ alkyl radical, X is oxygen, and Y is a polar radical selected from the group consisting of —OH and —COOH radicals.

2. A mineral lubricating oil composition comprising a major amount of mineral lubricating oil and from about 0.5% to about 5% of an ester of omega-hydroxy $C_{2-18}$ alkylmercaptomethylphosphonic acid and an alkanol having from 1 to 4 carbon atoms.

3. A mineral lubricating oil composition comprising a major amount of mineral lubricating oil and from about 0.5% to about 5% of dibutyl omega-hydroxybutylmercaptomethylphosphonate.

References Cited in the file of this patent

UNITED STATES PATENTS

| | | |
|---|---|---|
| 2,494,322 | Cyphers | Jan. 10, 1950 |
| 2,594,454 | Kosolapoff | Apr. 29, 1952 |
| 2,665,294 | Kosolapoff | Jan. 5, 1954 |
| 2,708,204 | Bell et al. | May 10, 1955 |
| 2,820,013 | Chapman et al. | Jan. 14, 1958 |
| 2,827,433 | Fischl et al | Mar. 18, 1958 |
| 2,844,616 | McDermott | July 22, 1958 |
| 2,879,285 | Birum | Mar. 24, 1959 |
| 3,041,279 | Calhoun et al. | June 26, 1962 |

FOREIGN PATENTS

| | | |
|---|---|---|
| 804,141 | Great Britain | Nov. 12, 1958 |